(12) United States Patent
Ooi et al.

(10) Patent No.: US 12,718,815 B2
(45) Date of Patent: Aug. 25, 2026

(54) DEVICE, SYSTEM AND METHOD FOR CONFIGURING A VOICE ASSISTANT FEATURE FOR RENTAL RADIO

(71) Applicant: MOTOROLA SOLUTIONS, INC., Chicago, IL (US)

(72) Inventors: Chun Wen Ooi, Georgetown (MY); Wan Sabrina Binti Wan Safuan, Kota Bharu (MY); Stephen C Glass, Plantation, FL (US); Chew Yee Cheong, Subang Jaya (MY); Anoop Sehgal Paras Ram, Ipoh (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 140 days.

(21) Appl. No.: 18/678,137

(22) Filed: May 30, 2024

(65) Prior Publication Data

US 2025/0372089 A1 Dec. 4, 2025

(51) Int. Cl.
*G10L 15/22* (2006.01)
*G06F 16/955* (2019.01)
*G06Q 30/0645* (2023.01)

(52) U.S. Cl.
CPC .......... *G10L 15/22* (2013.01); *G06F 16/9566* (2019.01); *G06Q 30/0645* (2013.01)

(58) Field of Classification Search
CPC .. G10L 15/22; G06F 16/9566; G06Q 30/0645
USPC .......................................................... 704/275
See application file for complete search history.

(56) References Cited

U.S. PATENT DOCUMENTS 7,739,590 B2 * 6/2010 Stocker ............... G06F 16/9535 715/248
11,604,790 B2 * 3/2023 Ranganathan .......... G10L 15/22
2002/0116368 A1 * 8/2002 Matsumoto ......... G06F 16/9537
2015/0212791 A1 * 7/2015 Kumar .................... G10L 15/22 715/728
2020/0014552 A1 * 1/2020 Tan ..................... H04L 12/2809
2020/0387825 A1 * 12/2020 Khan ................. G06F 16/3329
(Continued)

FOREIGN PATENT DOCUMENTS

CN 114970901 A * 8/2022 ......... G06Q 50/2057
IN 202311001357 A * 1/2023

*Primary Examiner* — Edwin S Leland, III
(74) *Attorney, Agent, or Firm* — Barbara R Doutre

(57) ABSTRACT

A system, method, and device are provided for configuring a voice assistant feature in portable radios for the rental radio market. The portal receives a request to configure the rental radio with a voice assistant feature as part of a rental registration for the event. The portal obtains access to a customer database. Based on that access, the portal obtains customer deployment context data. Customer environment functions are identified from the customer deployment context data for the event. Voice commands are generated by the portal for the identified customer environment functions. A mapping of voice commands to respective customer environment functions for the event is created and provided for customer verification and, if desired, customization. The portal then programs the portable rental radio(s) with the mapped voice commands to respective customer environment functions to complete the voice assistant configuration. The voice assistant configuration does not rely on natural language processing.

23 Claims, 8 Drawing Sheets

(56) References Cited

U.S. PATENT DOCUMENTS

| | | | | |
|---|---|---|---|---|
| 2021/0195011 | A1* | 6/2021 | Ellis | H04M 1/72442 |
| 2021/0264910 | A1* | 8/2021 | Young | G06F 16/243 |
| 2024/0338171 | A1* | 10/2024 | Goel | G06F 3/014 |
| 2025/0372089 | A1* | 12/2025 | Ooi | G06Q 30/0645 |

* cited by examiner

DEVICE, SYSTEM AND METHOD FOR CONFIGURING A VOICE ASSISTANT FEATURE FOR RENTAL RADIO

BACKGROUND OF THE INVENTION

Rental radio products and services cater to a broad range of industries and events, from large-scale construction sites and mining projects to international sports stadiums, music festivals, and shopping centers to name a few.

A voice assistant typically combines voice recognition with Artificial Intelligence (AI) to provide assistance to users. Typically, the voice assistant responds to voice requests by providing the requested information. The voice assistant may, for example, make phone calls, respond to questions, and play music, among other things.

The voice assistant feature has come into use in environments where radios are sold and/or permanently assigned to an agency, such as a public safety agency, and/or permanently assigned to an individual, such as a first responder. However, configuring a voice assistant for the radio rental market is far more challenging, as the radios may need different configuration from one rental customer to another. The rental customer may have specific needs and use cases which cannot be addressed by, for example, generic voice commands.

It would be beneficial to provide voice assistant capability which could handle the needs of different rental customers and events to improve the radio rental customer experience.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
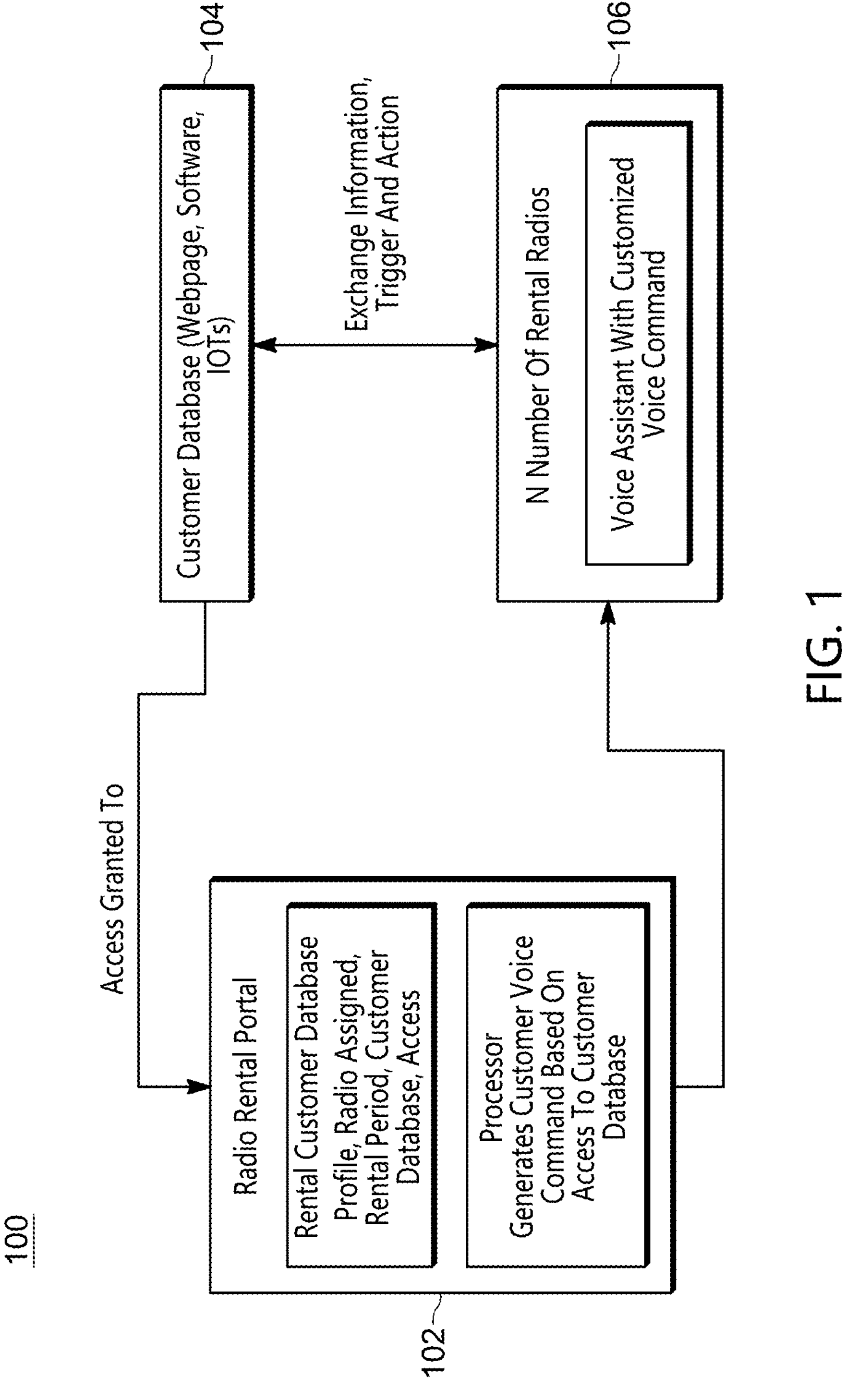
FIG. 1 is a system diagram for providing voice assistant configuration for rental radios, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Briefly, there is provided herein a method for configuring a voice assistant feature for a portable rental radio. The method comprises providing a radio rental portal (also referred to as portal) for renting portable radios to a customer for an event; receiving, at the portal, a request to configure the rental radio with a voice assistant feature as part of a rental registration for the event; obtaining, at the portal, customer database access to a customer database; obtaining, by the portal, customer deployment context data from the customer database; identifying, by the portal, at least one customer environment function from the customer deployment context data for the event; generating a voice command, by the portal, for the at least one identified customer environment function; creating a mapping of voice commands to respective customer environment functions for the event; providing, at the portal, the mapping for customer verification; and programming, by the portal, the portable rental radio with the customer verified mapping of voice commands and respective customer environment functions to complete the voice assistant configuration of the portable rental radio.

An aspect of the present specification provides for a portal having a processor for configuring a voice assistant feature for a portable rental radio, the portal processor configured to: provide a radio rental portal for renting portable radios to a customer for an event; receive a request to configure the rental radio with a voice assistant feature as part of a rental registration for the event; obtain customer database access to a customer database; obtain customer deployment context data from the customer database; identify at least one customer environment function from the customer deployment context data for the event; generate a voice command, by the portal, for the at least one identified customer environment function; create a mapping of voice commands to respective customer environment functions for the event; provide the mapping for customer verification; and program the portable rental radio with the customer verified mapping of voice commands and respective customer environment functions to complete the voice assistant configuration of the portable rental radio.

Another aspect of the present specification provides a communication system, comprising: a portal managed by a server for renting portable radios; a customer database, made accessible to the portal, for configuring a plurality of portable rental radios with a voice assistant feature. The voice assistant feature is configured by: obtaining, by the portal, customer deployment context data from the customer database for an event; identifying at least one customer environment function from the customer deployment context data for the event; generating a voice command, by the portal, for the at least one identified customer environment function; creating a mapping of voice commands to respective customer environment functions for the event; providing the mapping for customer verification; and programming the plurality of portable rental radios with the customer verified mapping to complete the voice assistant configuration of the portable rental radio.

Each of the above-mentioned embodiments will be discussed in more detail below, starting with example system and device architectures of the system in which the embodiments may be practiced, followed by an illustration of processing blocks for achieving an improved technical method, device, and system for configuring a portable radio with a voice assistant feature.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

FIG. 1 depicts a system diagram for voice assistant configuration of one or more portable radio(s) in a radio rental environment in accordance with some examples. The system 100 comprises a radio rental portal 102, customer database 104, and one or more portable radios 106 to be programmed for a customer event. The examples provided within the specification include concert events and sporting events but it is understood that the embodiments apply to any event in which portable radios may be rented. The radio rental portal 102 is understood to be managed by a portal server having at least one processor and a memory. The customer database 104 is understood to be managed by a customer server having at least one processor and a memory. The radio rental portal 102 may also be referred to as portal 102.

As part of the radio rental registration, the portal 102 is configured to access the customer database 104 in accordance with various examples to be described herein. The access to the customer database 104 may be provided, for example, via customer provided URLs. The portal 102 obtains customer deployment context data provided by the customer database 104 as part of the rental radio registration. The customer deployment context data may vary from event to event and customer to customer.

The customer deployment context data may include event name and/or type which may be used as a basis for the portal 102 to generate a customized wakeword for the event, (e.g. 'concertbot', 'concertsingernamebot 'soccerbot', soccermatchnameyearbot). The customized wakeword may be used for triggering the voice assistant feature of portable radio 106.

The customer deployment context data may include commands stored in a memory of the customer database 104, where such commands may further be associated to customer environment functions for different operations associated with an event. For example, for a concert type of event, the customer database 104 may have stored therein customer environment functions pertaining to production functions and/or security camera functions. As another example, for a soccer match type of event, the customer database 104 may have stored therein customer environment functions pertaining to security camera operations, television monitoring operations, stadium workflows, and athlete statistic tracking operations, and/or other capabilities to name a few.

The portal 102 identifies, based on the customer deployment context data, at least one customer environment function for a given event. The portal 102 then generates a voice command for each identified customer environment function. Depending on how the customer deployment context data is stored within the customer database 104, the relay of the customer environment function(s) to the portal 102, may (or may not) include commands associated with each function. The generation of the voice command for the identified customer environment function is performed without natural language processing, which is particularly advantageous for the rental radio market where different customers rent the portable radios for different events.

If commands are not provided by the customer database 104, then the portal 102 mines the customer deployment context data to determine and generate a voice command for the identified customer environment function. If commands are provided by the customer database 104, then the portal 102 may determine to re-use the customer database commands as voice commands and/or generate new voice commands better suited for input to the portable radio 106. In other words, even if commands are available in the customer database 104, some or all of the commands may not be suitable as a voice command for input to a portable radio 106. For example, the commands stored in the customer database 104 may be too long or too complex to be used by an individual inputting a voice command to the portable radio 106. For example, a customer database command of 'rotate stage camera 60 degrees in x/y plane and 30 degrees in z-plane' may be too complex for an individual user to input as a voice command to the portable radio 106. In this case, the portal 102 may convert the complex command stored in the customer database 104 to a voice command more suitable for input to the portable radio 106, such as a voice command 'rotate camera' with that command being assigned a predetermined rotation. Hence, the voice commands and/or re-use of customer-stored database commands as voice commands are generated, by the portal 102, as suitable input for recognition by the portable radio 106.

A mapping is created at the portal 102 which maps the portal-generated voice commands to respective associated customer environment functions. The mapping is provided by the portal 102. for customer verification and, if desired, customization. The portal 102 then programs the voice assistant feature of the portable radio(s) 106 with the verified voice commands for the associated customer environment functions. The portable radio(s) 106 may then be deployed to the event for use by the customer.

Once deployed to the event, the portable radio(s) 106 may trigger the voice assistant feature via the pre-configured wakeword (e.g. concertbot, soccerbot, to name a few), the wakeword having been configured, by the portal 102, based the event name/event type as previously described. Once the voice assistant feature is triggered, the voice command(s) may be input by a user to the portable radio 106 to trigger the associated customer event functions, for example operational actions at the event and/or retrieval of event information associated with the event from customer database 104.

Returning back to the discussion of voice commands, the generation of suitable voice commands with which to configure the portable radio(s) 106 may be based on the portal 102 being granted predetermined access to the customer database 104 for retrieval of the customer deployment context data. For example, the predetermined access may be provided by one or more of customer provided Uniform Resource Locator(s) URL(s). The customer provided URL(s) may link to one or more of a command file, an Application Programming Interface (API) specification, an event webpage, documents, event software, and event controlled Internet of Things (IOTs), stored within the customer database 104. The portal 102 accesses the customer database 104, retrieves the customer deployment context data, and performs processing thereon. Such processing may include, but is not limited to, mapping a retrieved command file to generate suitable voice commands that can trigger the same customer environment function; and/or mining a retrieved API specification to identify customer environment function(s) to generate suitable voice commands for those functions; and/or mining and mapping context data retrieved from the customer database for comparison to predefined use case file stored in the portal to determine previously used voice commands suitable for the portable radio(s) 106. The following Table 1 shows an example of different customer database access, mapping, and the radio rental processing associated therewith:

TABLE 1

| Customer-provided Access Means (to Retrieve Customer Deployment Context Data): | Radio Rental Portal 102 Processing (on the Customer Deployment Context Data): | Radio Rental Portal Processing Description: |
|---|---|---|
| Customer URL which links to commands for customer environment | Command File Mapping | Portal 102 processes the customer command file to generate radio voice commands for customer environment |
| Customer provided URL and customer provided API specification document | API Mining | Portal 102 processes the API(s) to generate radio voice commands for customer environment |
| Customer provided URL(s) which link to context data (e.g. retrieved from use case information, event webpages, files, documents, software, IOTs stored at customer database) for comparison to predefined use cases stored within the portal | Context Mining and mapping | Portal 102 processes customer database to identify context(s) that matches with predefined voice commands from a different event stored at the portal |

The following Table 2 provides an example of event type, customer provided database access, and generation of voice command for two different types of events:

TABLE 2

| | Previous Rental Customer | New radio Rental Customer |
|---|---|---|
| Event | Music Concert | Sport Event |
| Database | https://www.concertevent.org/<br>Concert Event Management SW participants information, stage IOTs (lighting, speaker, microphone, fireworks, stage curtain) control<br>Security Camera command central | https://www.fifa2026.com/<br>FIFA Event Management software<br>Security camera command central<br>Orchestrate workflow |
| Voice Assistant Wakeword | CONCERTBOT | SOCCERBOT |
| Generated Voice Command | ON/OFF STAGE CURTAIN<br>ON/OFF FIREWORKS<br>ON/OFF SPOTLIGHT<br>INCREASE/REDUCE MUSIC VOL<br>CHECK NEXT SONG<br>CAMERA ZOOM TO SINGER/GUITARIST/DANCER/AUDIENCE | CHECK NEXT MATCH<br>SEARCH PLAYER ___<br>REPLAY FOOTAGE<br>CHECK OFFSIDE/FOUL<br>CAMERA ZOOM PLAYER/AUDIENCE/REFEREE/TEAM A/TEAM B/COACH<br>CREATE WORKFLOW<br>EDIT WORKFLOW<br>RUN/STOP WORKFLOW |

The system 100 advantageously enables a portal 102 to generate voice commands suitable for a portable radio voice assistant feature. The system 100 enables the same portable radio(s) to be uniquely configured for different types of events based on customer environment functions extracted from customer deployment context data, where such data is accessed from a customer database, and wherein such access is provided via customer designated access. The system may further advantageously provide for different radio configurations for a single event based on the role of different users. For example, radios rented for security personnel for a rock concert may be configured for security-related voice commands different from those of road-crew personnel associated with the concert. Hence, the access to the customer database data may further be associated with the role of the intended end-user.

Figure 2:
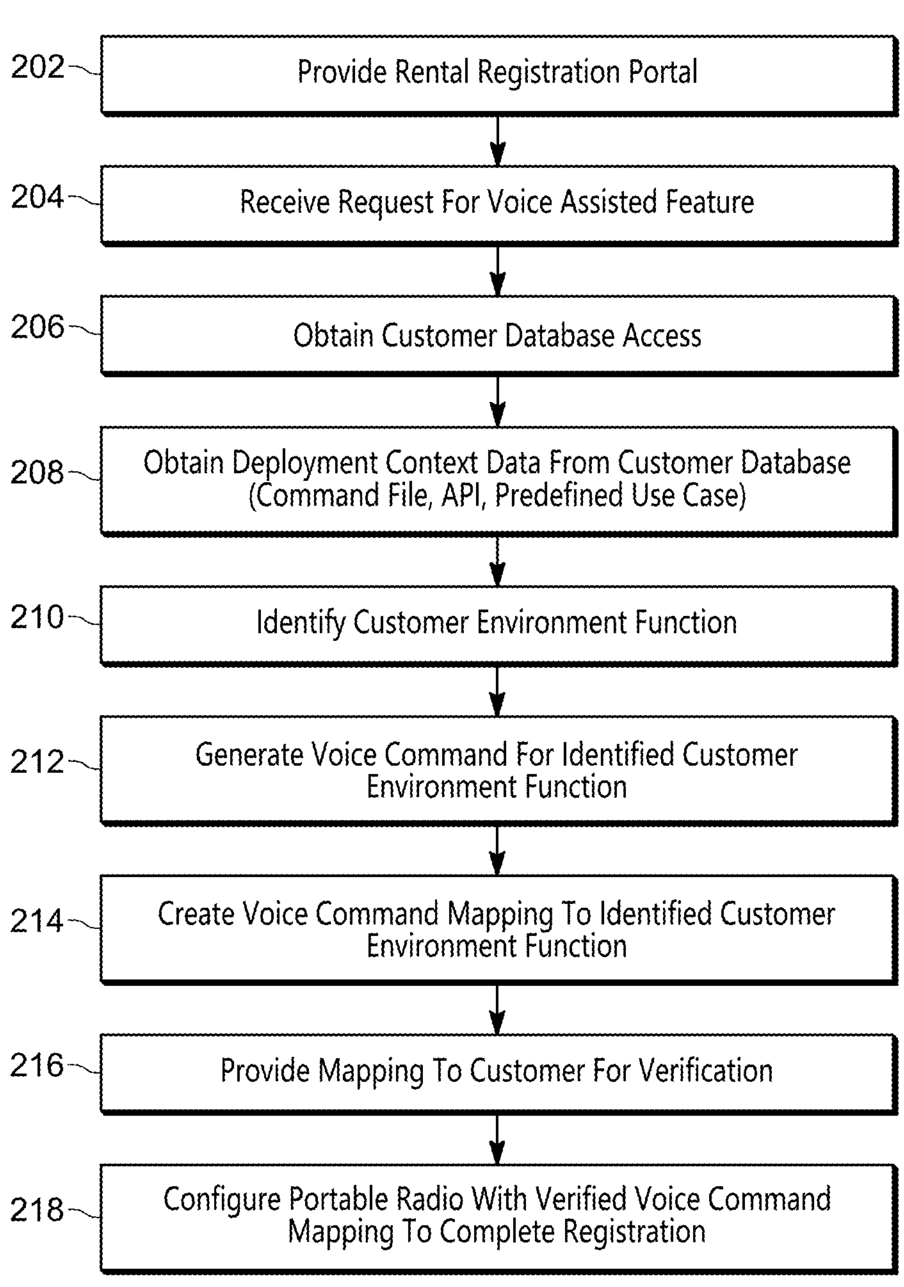
FIG. 2 is a flowchart of a method for configuring a voice assistant feature for a rental radio, in accordance with some examples.

FIG. 2 depicts a flowchart of a method 200 for configuring a voice assistant feature for a rental radio, in accordance with some examples. Method 200 begins by providing a radio rental portal, such as portal 102 of FIG. 1, for renting portable radios to a customer for an event at 202. The method continues at 204 with obtaining, via the portal, a request to configure the rental radio with a voice assistant feature. In response to receiving the request for the voice assistant feature, the portal obtains customer database access at 206. The customer database access may be provided, for example, by a customer provided URL.

At 208, the portal then gains access to and obtains customer deployment context data from the customer database. The customer deployment context data stored at the customer database may include, one or more of customer command files, API specification, and/or event webpage, event documents, event software, and/or event IOTs to name a few. Examples including URL link(s) to command files, URL link to API specification, and URL link to customer database to retrieve event information for comparison to predefined user case files stored at the portal, are provided as will be described later with reference to FIGS. 3, 4 and 5. From this customer deployment context data, the method 200 continues with identifying, by the portal, at least one customer environment function for the event at 210.

The identification of at least one environment function may further include mining the customer deployment context data. For example, as previously mentioned with reference to FIG. 1, some files containing the customer deployment context data may already include command data associated with event functions, while other files may not contain command data but may include event function data. The customer deployment context data may be stored within files containing other unrelated data, from which the context data may be extracted. Still other files may contain lengthy/complex commands and/or lengthy/complex functions. The mining of the context data facilitates extracting data that pertains to commands and associated environment functions that can be converted into voice commands, suitable for voice command entry into the portable radio. For example, the mining of the environment context data may be performed by machine analytics which identify key words within a lengthy data string.

The method 200 then moves to 212 with generating a voice command, by the portal, for each respective identified customer environment function. At 214 the method 200 proceeds by creating, by the portal, a mapping of voice command(s) to respective customer environment function(s). At 216, the method 200 proceeds with providing, by the portal, the mapping to the customer for verification, and if desired customization of voice command at 216. Customization may include adding, deleting or modifying a word within the voice command. The method continues to 218 with configuring, by the portal, the portable radio(s) with the verified mapping to complete the rental registration. The portable radio(s) may thus be deployed to the event with the configured voice assistant feature which includes verified voice commands suitable for managing the customer environment functions.

Figure 3:
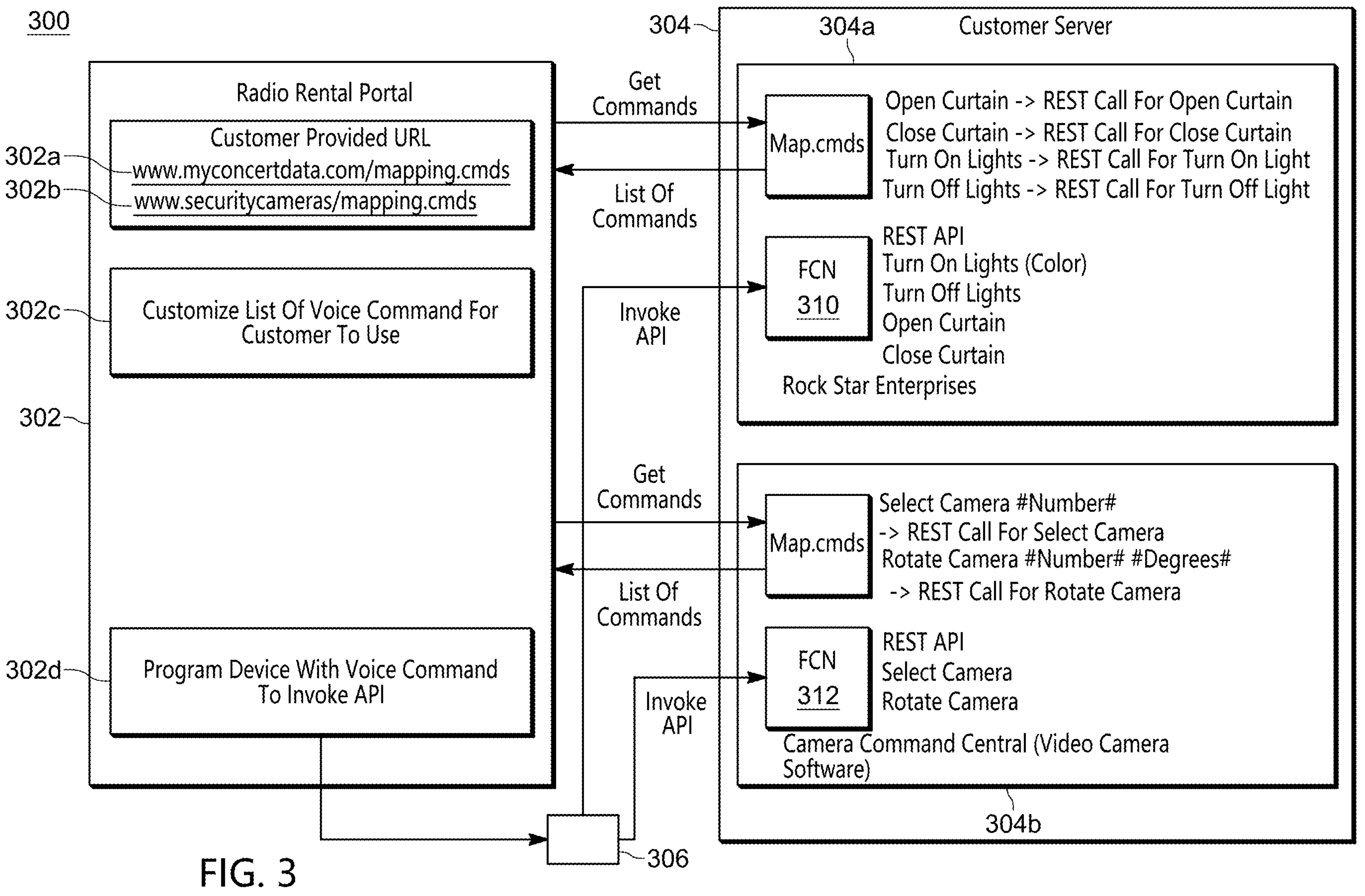
FIG. 3 depicts the system of FIG. 1 implementing a method for configuring a voice assistant using command file mapping, in accordance with some examples.

FIG. 3 depicts the system of FIG. 1 implementing a method for configuring a voice assistant feature of one or more portable radios, in accordance with some examples. The system 300 includes a radio rental portal 302, a customer server 304, and one or more portable radios 306, the portable radio(s) to be configured with a voice assistant feature for a customer event. In this example, the customer server 304 manages associated customer databases **304*a* and 304*b* which respectively store commands mapped to API functions, where the API functions manage functions associated with the event. In this example the voice assistant feature is configured based on customer deployment context data retrieved from the customer databases 304***a*, 304*b* in the form of the mapped command files. Examples of REpresentative State Transfer (REST), such as REST API, REST Call are shown. The REST acronym stands for Representational State Transfer. The REST API represents an application programming interface (API or web API) which allows for interaction with REST designated web services.

In this example, the customer database access is provided to radio rental portal 302 via one or more customer provided URL(s) 302*a*, 302*b* uploaded by the customer server 304 as part of the rental registration. The customer provided URL 302*a* provides portal access to the customer deployment context data in the form of the mapping commands stored in customer database 304*a*. The mapping command(s) stored in customer database 304*a* comprise at least one command mapped to a respective customer environment function. For example, the portal 302 may access via URL 302*a* a plurality of commands mapped to production operational functions associated with a customer concert event stored within customer database 304*a*. The command mapping of production operational functions for a concert event, may include, for example, open/close curtain commands associated with open/close curtain functions, on/off/dim lighting commands associated lighting functions, to name a few. As another example, the portal 302 may access, via URL 302*b*, commands mapped to security camera operational functions stored at customer database 304*b* associated with the concert event. The security camera operational functions for a concert event, may include, for example, select camera, rotate camera commands associated with security camera functions, to name a few.

A listing of commands mapped to operational functions is provided to the portal 302. The portal 302 then processes the list of database commands and associated customer environment functions to use as a basis for generating a voice command suitable for a portable radio voice assistant feature. The voice command generated by the portal 302 with associated function is then verified by the customer at 302*c* and customized if desired. As mentioned previously, not all database commands may be appropriate for use as voice commands for a portable radio. For example, the database command may be too long/too many words for a user working at the event, and/or too database command may be too complex for receive audio circuitry to decipher in a noisy event environment).

The portal 302 then programs at 302*d* the one or more radios 306 with the voice commands that will invoke the associated customer environment functions for the event. For example, the voice commands input to the radio 306 may invoke APIs which trigger the associated event function. The portable radio(s) 306 may now be deployed to the event with the optimized voice commands, suitable for customer usage at the event.

Figure 4:
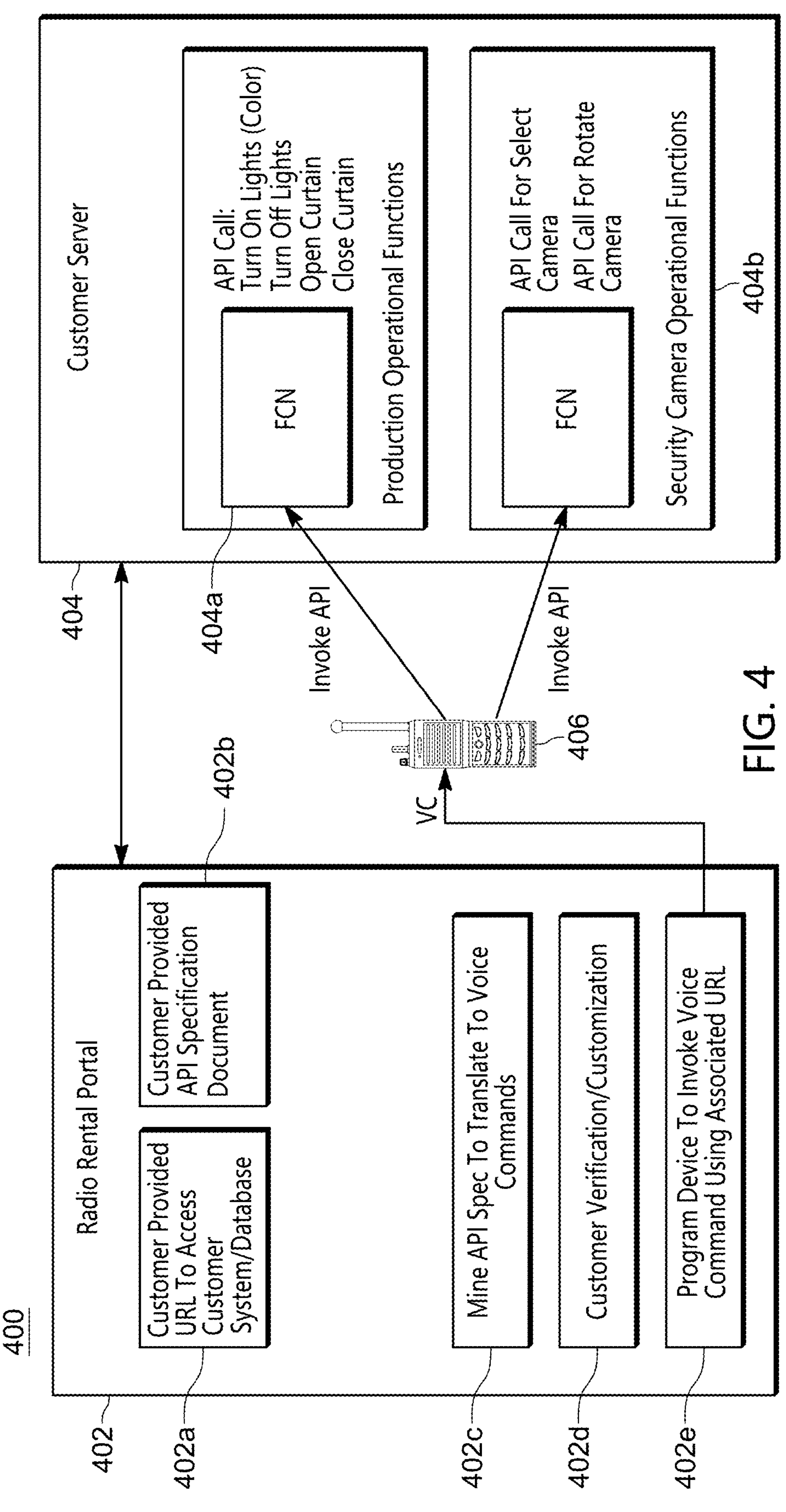
FIG. 4 depicts the system of FIG. 1 implementing a method for configuring a voice assistant using API mining, in accordance with some examples.

FIG. 4 depicts the system of FIG. 1 implementing a method for configuring a voice assistant feature for a portable radio in accordance with some examples. The system 400 includes a radio rental portal 402, a customer server 404, and one or more portable radios 406, the portable radio(s) to be configured with a voice assistant feature for a customer event. In this example the voice assistant feature is configured based on customer deployment context data which the portal mines to generate voice commands for at least one customer environment function In this example, both a customer provided URL(s) to the Customer System/Database 402*a* and customer provided API specification document 402*b* are provided to the radio rental portal 402 by the customer as part of the rental registration. The customer provided URL 402*a* provides the radio rental portal 402 with access to the customer deployment context data from the customer server 404. The customer server 404 contains the operational functions on the customer side.

At 402*c*, the portal 402 mines the customer provided API specification document 402*b* and uses the context data from customer server 404 obtained using the customer provided URL 402*a*, to determine at least one customer environment function associated with the customer event and generate a voice command to associate with the function. During the generation of the voice command relating to context data in 402*c*, the correlation between the context data and the associated APIs from the API specification document are used to program the generated voice command. For example, the mining of the API specification document at 402*c* may be used to determine a production operational function and/or a security camera operational function, to name a few. These operational functions are identified by the portal 402, and respective associated voice commands are generated by the portal that may be used to trigger the identified function, when programmed in the portable radio(s) 406. The portal 402 provides for customer verification and/or further customization of the voice commands and associated functions at 402*d*.

The portable radio 406 is programmed at 402*e* with the verified voice command(s), wherein the voice commands are programmed to invoke the appropriate API in tandem with the server URL. Invoking the API triggers an API call at the server 404 to control the associated customer environment function. For example, a voice command input to the portable radio 406 may invoke an API that triggers the server 404 to make an API call that controls a production operational function stored in customer database 404*a*, such as a turn on/off venue lighting function for the customer event, or an open/close curtain function for the event. As another example, a voice command may be input to the radio 406 to invoke an API that triggers the server 404 to make an API call that controls a security camera operational function for the event, such as camera selection for the event, camera rotation for the event, to name a few. Hence, the voice assistant configuration advantageously mines the API specification document based on features already configured by the customer server, without the need for customer input.

Figure 5:
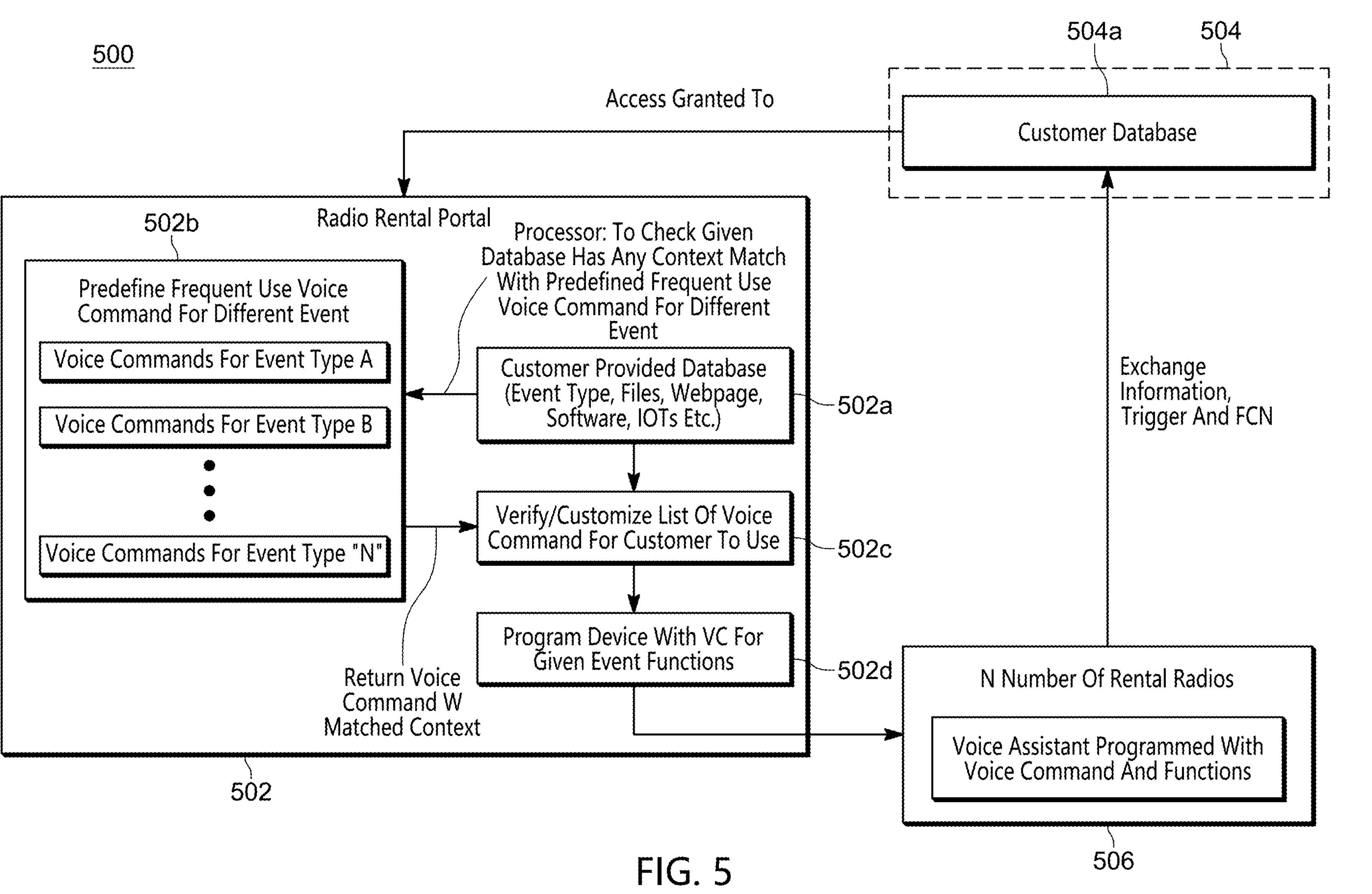
FIG. 5 depicts the system of FIG. 1 implementing a method for configuring a voice assistant using predefined use case context mapping, in accordance with some examples.

FIG. 5 depicts the system of FIG. 1 implementing a method for configuring a voice assistant feature for a portable radio, in accordance with some examples. The system 500 includes a radio rental portal 502, a customer server 504, and one or more portable radios 506, the portable radio(s) to be configured with a voice assistant feature for a customer event. In this example, the customer server 504 manages associated customer database 504*a* which has stored therein customer deployment context data for a plurality of predefined customer events. In this example, the customer deployment context data stored within customer database 504*a* may include event information such as event types, event files, webpages, event software, and IoT control information, to name a few.

In this example, the customer deployment context data access is provided via a customer provided URL that links to event files, customer webpage, event software, and/or IOTs (for example: http://www.eventexample.com, http://iotexample.com) to the radio rental portal 502. The customer database may also provide remote computer access information including computer name, IP address, port number (example: 192.168.1.100.3389) and access password to radio rental portal 502 to access the customer database for security purposes. The portal 502 processor then determines if any of the customer deployment context data matches with context provided by previously generated (predefined) voice commands stored at portal 502. For example, Table 3 shows uploaded customer environment functions which align with context from previously generated voice commands used by the portal 502 for a concert event.

TABLE 3

| Customer-Provided Database contains | Generated Voice Command |
|---|---|
| Stadium map | Open stadium map |
| Song list | Check next song |
| List of dancers associated with respective songs | Alert #song title# dancers standby |

Table 4: shows uploaded customer environment functions which align with context from previously generated voice commands used by the portal 502 for a marathon event.

TABLE 4

| Customer-Provided Database contains | Generated Voice Command |
|---|---|
| Arrival registration record | Check percentage of arrival registration |
| Finisher statistics | Check percentage of finishers |
| Runner health data | Check health profile of #runner number" |

The portal 502 returns the successful matches of previously generated (predefined) voice commands, for a given event as shown at 502*b*. For example, the processor may generate a list of the predefined voice commands for an event type A, previously defined voice commands for an event type B, and so on. These commands are now used as the voice commands with which to configure the voice assistant feature as part of the radio rental registration.

If a customer-provided database does not contain sufficient context that matches with a predefined voice command, then the voice command will not be generated. For example, if the customer-provided database does not include runner health data, the voice command 'check #runner number" health profile' will not be generated. Customer verification and/or customization of the generated voice commands for the given event takes place at 502*c*.

The portable radio(s) 506 is/are then programmed at 502*d* with the predefined voice command(s) generated within the list. These predefined voice commands will trigger the associated environment function(s) at the customer database 504*a* for a given event. The generated voice commands may trigger operational functions associated with an event as previously described, such as 'open/close curtain, 'dim stage lighting', 'rotate camera 123', and the like. The generated voice commands may also trigger an exchange of information between the portable radio 506 and the customer database 504*a* associated with an event (e.g. 'where is athlete abc?', 'what are the stats for athlete abc', retrieve health profile for athlete abc', and the like).

The portal 502 may save the list of voice commands associated with different event types to memory and then call upon these voice commands when programming radio(s) for different types of event, thereby expediting the configuration of the voice assistant feature to portable radio(s) 506.

Figure 6:
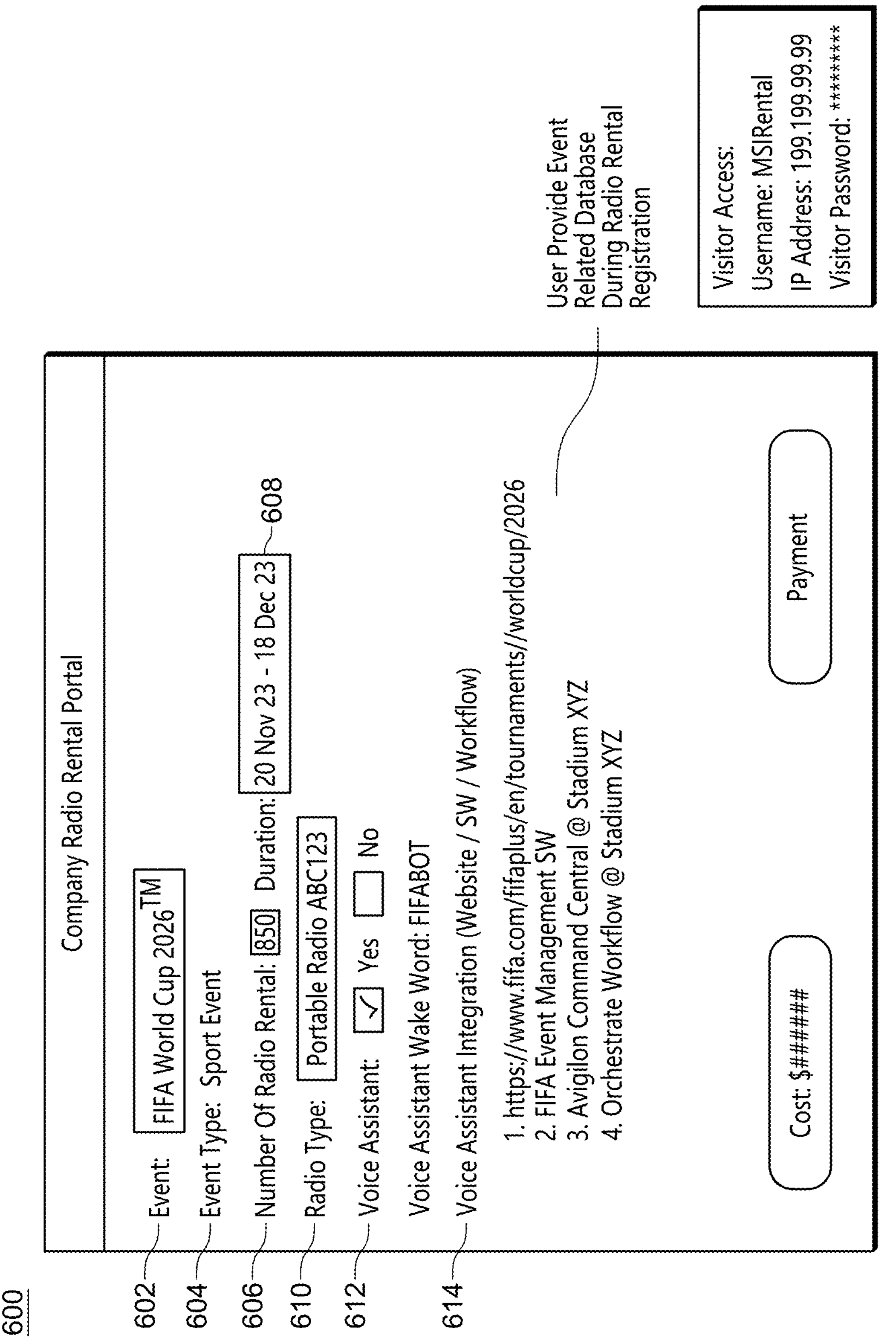
FIG. 6 depicts a first stage user interface example for the radio rental portal of FIG. 1 implementing order and payment, in accordance with some examples.

FIG. 6 depicts a first stage user interface example for the radio rental portal of FIG. 1 implementing order and payment, in accordance with some examples. Portal view 600 shows an event name that has been entered at event input 602. The event type may be automatically recognized, via the portals' previously stored radio rental configurations. The customer enters the number of radios to be rented at 606 along with rental period at 608. The customer selects the type of radio for the rental order at 610.

In accordance with the embodiments, the portal provides a user selectable option to have the radios configured with a voice assistant feature at 612. With this voice assistant feature enabled, the user is prompted and in response thereto, uploads event related databases at 614, from which customer deployment context data will be uploaded or retrieved. Appropriate username, password, and IP address are provided by the customer to allow the portal to access the listed customer databases. Cost and payment prompts may also be provided at this stage, or provided at other stages.

Figure 7:
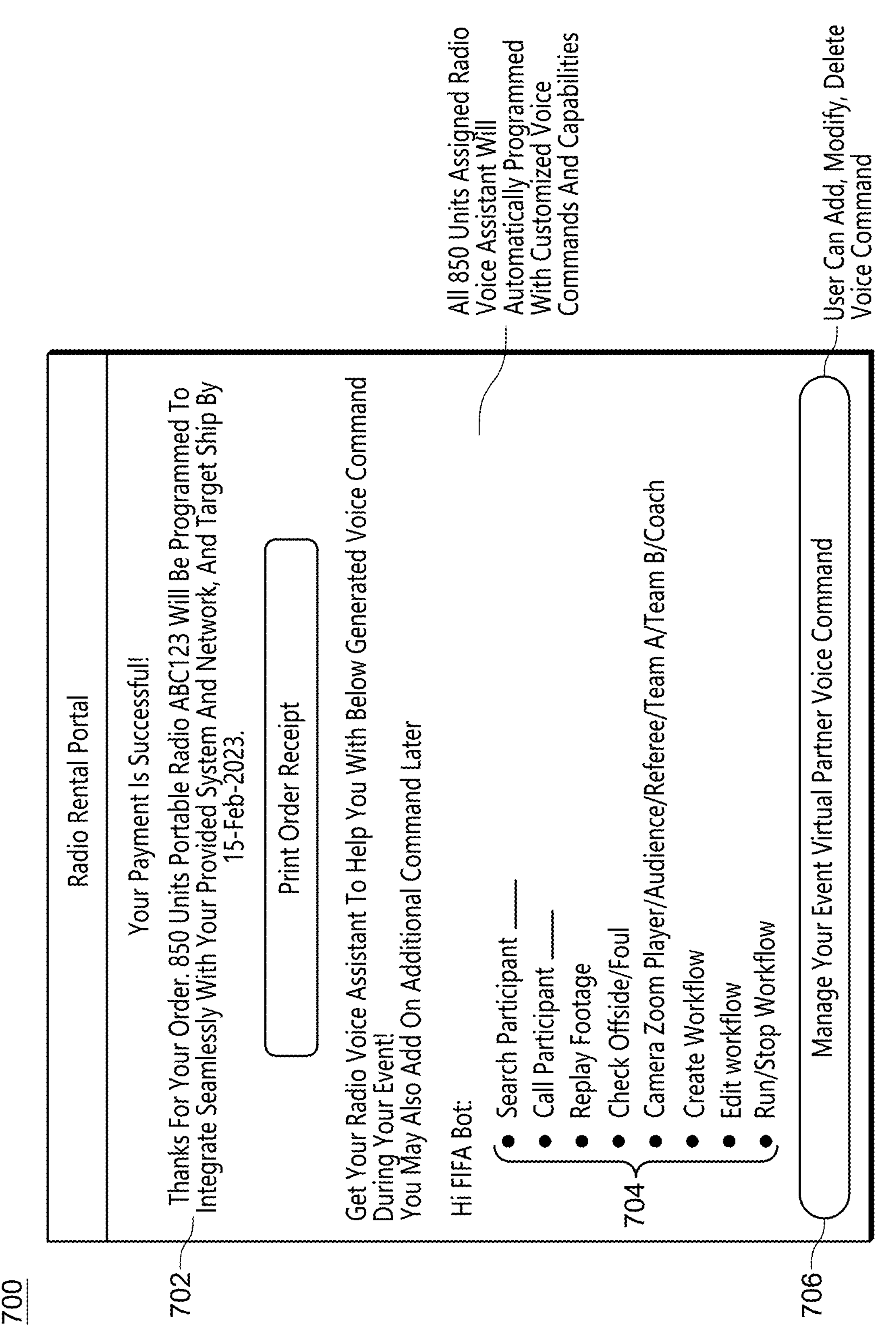
FIG. 7 depicts a second stage user interface example for the radio rental portal of FIG. 1 implementing voice assistant configuration, in accordance with some examples.

FIG. 7 depicts a second stage user interface example for the radio rental portal of FIG. 1 implementing voice assistant configuration, in accordance with some examples. Portal view 700 acknowledges successful payment and registration at 702. All radios associated with the rental registration are then programmed automatically with the voice assistant feature, the voice assistant feature providing the voice command(s) as listed, for example, at 704. The customer is also provided with an option to manage the voice assistance commands at 706.

Figure 8:
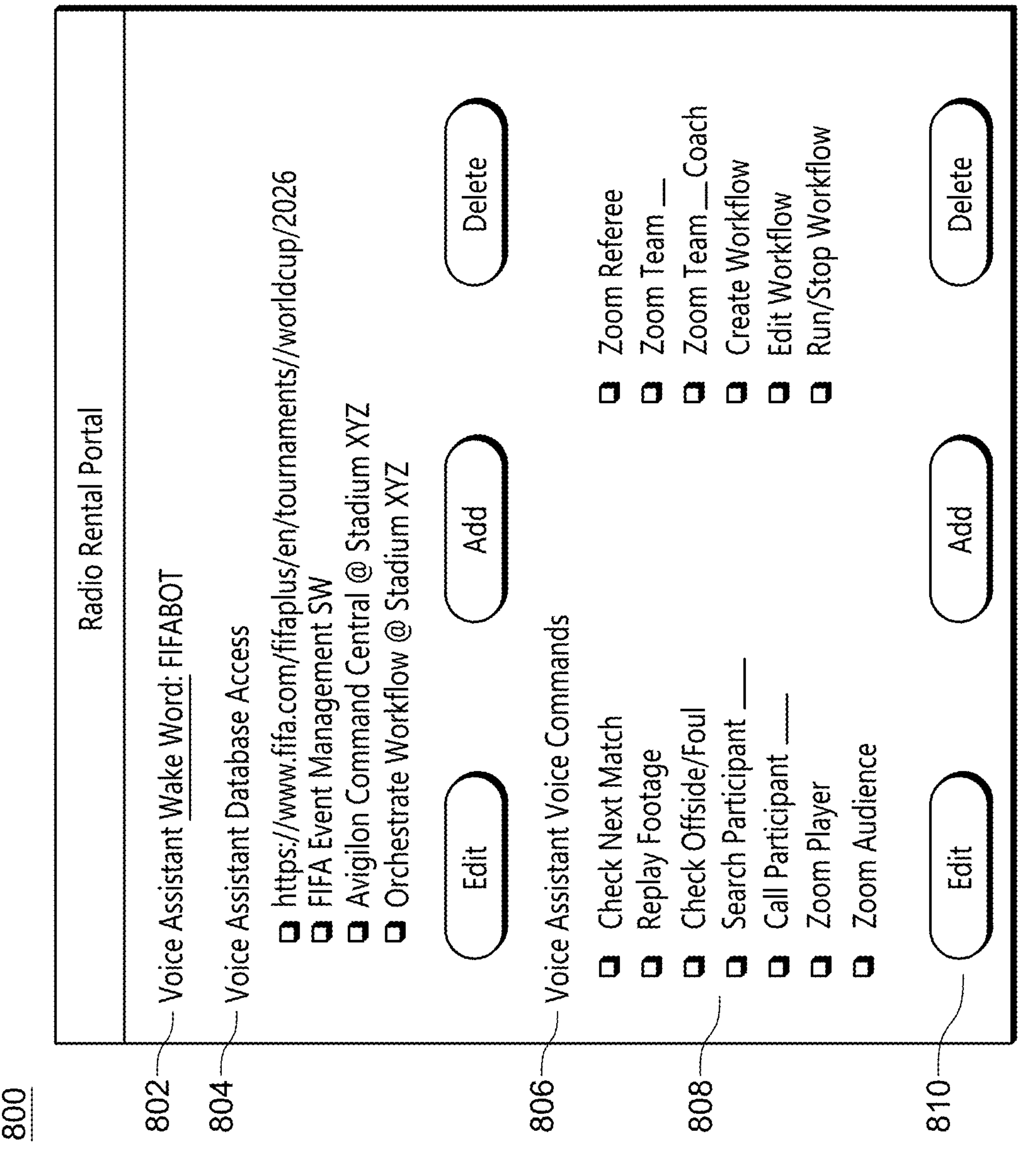
FIG. 8 depicts a third stage user interface example for the radio rental portal of FIG. 1 implementing voice assistant management, in accordance with some examples.

FIG. 8 depicts a third stage user interface example for the radio rental portal of FIG. 1 implementing voice assistant management, in accordance with some examples. Portal view 800 shows a voice assistant wakeword generated at 802. Examples for various database access and name(s) are listed at 804, with edit, add, and delete options at 806. The generated voice commands are listed at 808, with edit, add, and delete options at 810. For example, if the customer wishes to add a voice command, then it may be necessary to upload an additional database, or provide increased access to an existing database. As another example, if a customer wants to reduce the number of voice commands, then the customer may delete the undesired voice command, and/or if several undesired voice commands are associated with a single database, then the customer may simply remove the database associated with the undesired commands.

Accordingly, there has been provided a system, method and device for configuring a voice assistant feature for one or more portable radios. The voice assistant configuration is particularly well suited to the rental radio market. The voice assistance configuration advantageously enables the generation of optimized commands suitable for use with portable radios which are rented to different rental customers for different types of events. The generation of voice commands is seamless to the user while still allowing for customer verification and adjustment, if desired, thereby facilitating the radio rental customer experience, without reliance on natural language processing.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, cannot train a machine learning model, cannot configure a voice assistant feature, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term “one of”, without a more limiting modifier such as “only one of”, and when applied herein to two or more subsequently defined options such as “one of A and B” should be construed to mean an existence of any one of the options in the list alone (e.g., A alone or B alone) or any combination of two or more of the options in the list (e.g., A and B together).

A device or structure that is “configured” in a certain way is configured in at least that way, but may also be configured in ways that are not listed.

The terms “coupled”, “coupling” or “connected” as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for configuring a voice assistant feature for a portable rental radio, comprising:

providing a radio rental portal for renting portable radios to a customer for an event;

receiving, at the portal, a request to configure the rental radio with a voice assistant feature as part of a rental registration for the event;

obtaining, at the portal, customer database access to a customer database;

obtaining, by the portal, customer deployment context data from the customer database;

identifying, by the portal, at least one customer environment function from the customer deployment context data for the event;

generating a voice command, by the portal, for the at least one identified customer environment function;

creating a mapping of voice commands to respective customer environment functions for the event;

providing, at the portal, the mapping for customer verification;

programming, by the portal, the portable rental radio with the customer verified mapping of voice commands and respective customer environment functions to complete the voice assistant configuration of the portable rental radio; and:

obtaining, at the portal, an event name indicative of an event type, the event name being entered by the customer to the portal as part of a rental registration for the event; and converting, at the portal, the event name indicative of the event type to a wakeword for triggering the voice assistant feature.

2. The method of claim 1, wherein the customer database access is obtained by a customer provided Uniform Resource Locator (URL).

3. The method of claim 2, wherein the customer provided URL links the portal to at least one:

customer command file;

an application programming interface (API) specification;

an event webpage;

event software; and event controlled Internet of Things (IOTs).

4. The method of claim 1, wherein identifying, by the portal, at least one customer environment function for the event further comprises:

mining the customer deployment context data to determine the at least one customer environment function.

5. The method of claim 1, wherein the customer deployment context data is obtained from one or more of:

a command file mapped to customer environment functions, a customer provided API specification document;

customer webpage;

customer controlled internet of things (IOTs); and event software.

6. The method of claim 1, further comprising:

storing, at the portal, the customer verified mapping of voice commands to identified customer environment functions for past events.

7. The method of claim 1, wherein generating a voice command for the at least one identified customer environment function is performed without natural language processing.

8. A method for configuring a voice assistant feature for a portable rental radio, comprising:

providing a radio rental portal for renting portable radios to a customer for an event;

receiving, at the portal, a request to configure the rental radio with a voice assistant feature as part of a rental registration for the event;

obtaining, at the portal, customer database access to a customer database;

obtaining, by the portal, customer deployment context data from the customer database;

identifying, by the portal, at least one customer environment function from the customer deployment context data for the event;

generating a voice command, by the portal, for the at least one identified customer environment function;

creating a mapping of voice commands to respective customer environment functions for the event;

providing, at the portal, the mapping for customer verification;

programming, by the portal, the portable rental radio with the customer verified mapping of voice commands and respective customer environment functions to complete the voice assistant configuration of the portable rental radio; and:

re-using customer verified voice commands that align with customer environment functions for different events.

9. A portal having a processor for configuring a voice assistant feature for a portable rental radio, the portal processor configured to:

provide a radio rental portal for renting portable radios to a customer for an event;

receive a request to configure the rental radio with a voice assistant feature as part of a rental registration for the event;

obtain customer database access to a customer database;

obtain customer deployment context data from the customer database;

identify at least one customer environment function from the customer deployment context data for the event;

generate a voice command, by the portal, for the at least one identified customer environment function;

create a mapping of voice commands to respective customer environment functions for the event;

provide the mapping for customer verification;

program the portable rental radio with the customer verified mapping of voice commands and respective customer environment functions to complete the voice assistant configuration of the portable rental radio; and obtain an event name indicative of an event type, the event name being entered by the customer to the portal as part of a rental registration for the event; and convert, the event name indicative of the event type, to a wakeword for triggering the voice assistant feature.

10. The portal of claim 9, wherein the customer database access is obtained by a customer provided Uniform Resource Locator (URL).

11. The portal of claim 10, wherein the customer provided URL links to at least one:

customer command file;

application programming interface (API) specification;

event webpage;

event software; and event controlled Internet of Things (IOTs).

12. The portal of claim 9, the processor is further configured to:

mine the customer deployment context data to determine the at least one customer environment function.

13. The portal of claim 9, wherein the customer deployment context data is obtained from one or more of:

a command file mapped to customer environment functions, a customer provided API specification document;

customer webpage;

customer controlled internet of things (IOTs); and event software stored within the customer database.

14. The portal of claim 9, wherein the portal processor if further configured to:

store in a memory of the portal, the customer verified mapping of voice commands to identified customer environment functions for past events.

15. A portal having a processor for configuring a voice assistant feature for a portable rental radio, the portal processor configured to:

provide a radio rental portal for renting portable radios to a customer for an event;

receive a request to configure the rental radio with a voice assistant feature as part of a rental registration for the event;

obtain customer database access to a customer database;

obtain customer deployment context data from the customer database;

identify at least one customer environment function from the customer deployment context data for the event;

generate a voice command, by the portal, for the at least one identified customer environment function;

create a mapping of voice commands to respective customer environment functions for the event;

provide the mapping for customer verification;

program the portable rental radio with the customer verified mapping of voice commands and respective customer environment functions to complete the voice assistant configuration of the portable rental radio;

wherein the portal processor is further configured to:

re-use verified voice commands that align with customer environment functions for different events.

16. A portal having a processor for configuring a voice assistant feature for a portable rental radio, the portal processor configured to:

provide a radio rental portal for renting portable radios to a customer for an event;

receive a request to configure the rental radio with a voice assistant feature as part of a rental registration for the event;

obtain customer database access to a customer database;

obtain customer deployment context data from the customer database;

identify at least one customer environment function from the customer deployment context data for the event;

generate a voice command, by the portal, for the at least one identified customer environment function;

create a mapping of voice commands to respective customer environment functions for the event;

provide the mapping for customer verification;

program the portable rental radio with the customer verified mapping of voice commands and respective customer environment functions to complete the voice assistant configuration of the portable rental radio;

wherein the portal processor is further configured to:

generate the voice command for the identified customer environment function without natural language processing.

17. A communication system, comprising:

a portal managed by a server for renting portable radios;

a customer database, made accessible to the portal, for configuring a plurality of portable rental radios with a voice assistant feature, wherein the voice assistant feature is configured by:

obtaining, by the portal, customer deployment context data from the customer database for an event;

identifying at least one customer environment function from the customer deployment context data for the event;

generating a voice command, by the portal, for the at least one identified customer environment function;

creating a mapping of voice commands to respective customer environment functions for the event;

providing the mapping for customer verification; and programming the plurality of portable rental radios with the customer verified mapping to complete the voice assistant configuration of the portable rental radio; and wherein the portal is further configured to:

re-use verified voice commands of the customer verified mapping that align with customer environment functions for different events.

18. The communication system of claim 17, wherein the portal accesses the customer database via a customer provided Uniform Resource Locator (URL).

19. The communication system of claim 18, wherein the customer provided URL links the portal to at least one:

customer command file;

application programming interface (API) specification;

event webpage;

event software, and event controlled internet of things (IOTs).

20. The communication system of claim 17, wherein the portal is further configured to:

mine the customer deployment context data to determine the at least one customer environment function.

21. The communication system of claim 17, wherein the portal is further configured to:

store in a memory of the portal, the customer verified mapping of voice commands to identified customer environment functions for past events.

22. The communication system of claim 17, wherein the portal is further configured to:

generate the voice command for the identified customer environment function without natural language processing.

23. The communication system of claim 17, wherein the customer deployment context data is obtained from one or more of:

a command file mapped to customer environment functions, a customer provided API specification document;

customer webpage;

customer controlled IOTs; and event software stored within the customer database.

* * * * *